Figures 1, 2:
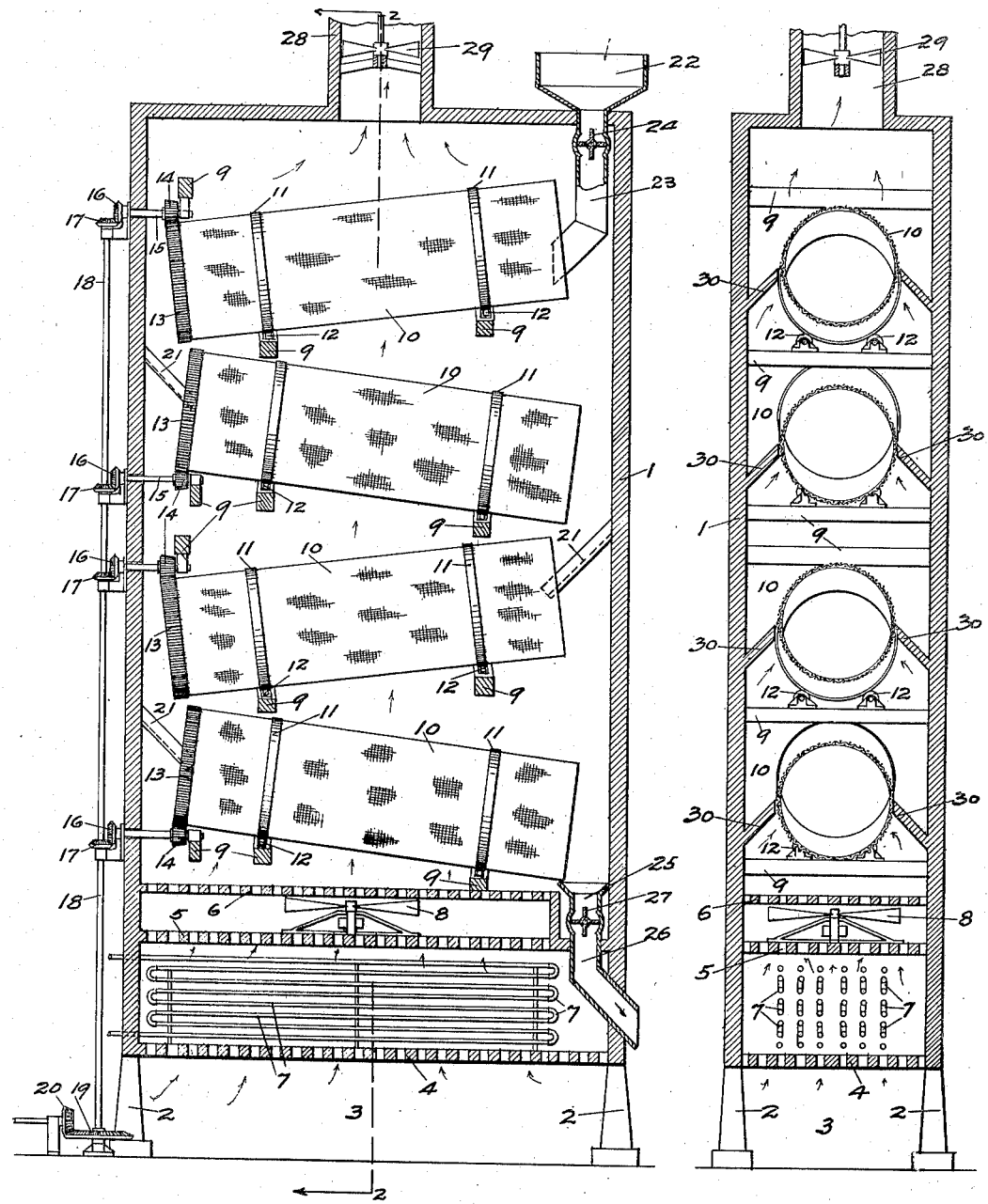

UNITED STATES PATENT OFFICE.

RALPH W. KING AND HERBERT G. MILLER, OF THE DALLES, OREGON; SAID KING ASSIGNOR TO SAID MILLER.

EVAPORATOR.

1,303,209.     Specification of Letters Patent.     Patented May 6, 1919.

Application filed April 14, 1917. Serial No. 162,164.

*To all whom it may concern:*

Be it known that we, RALPH W. KING and HERBERT G. MILLER, citizens of the United States, residing in The Dalles, county of Wasco, and State of Oregon, have invented certain new and useful Improvements in Evaporators, of which the following is a specification.

Our invention relates to evaporators, and more particularly to improvements in evaporators designed especially for drying fruit, vegetables and the like, by a continuous process; that is, an evaporator in which the matter to be dried moves progressively through the apparatus by gravity, being thoroughly dried as it moves along its course to the place of discharge.

In order to illustrate our invention, we have shown one practical embodiment thereof in accompanying sheet of drawings, which we will now describe.

Figure 1 is a vertical sectional view through an evaporator embodying our invention; and Fig. 2 is a vertical cross sectional view thereof, taken on the line 2—2 of Fig. 1.

Referring now in detail to the drawings, our invention comprises a vertical housing 1, set upon supports 2—2, whereby to provide an air space 3 thereunder, said housing being provided in its lower end with spaced floor structures 4, 5 and 6, of open, lattice-like construction, whereby air can be passed upwardly therethrough. Between the floor structures 4 and 5, is mounted a series of heating pipes 7, whereby air passing upwardly through the openings in said floor structures will be heated by said heating pipes, which may be heated either by steam or hot water. Mounted between the floor structures 5 and 6, is a fan-like structure 8, intended more as an air mixer, or agitator, than as a fan, whereby the air passing upwardly through the three floor structures 4, 5 and 6 will be thoroughly agitated in the chamber between the floor structures 5 and 6, before it passes upwardly into the housing. Said fan structure can be driven from any suitable source of power.

Mounted cross-wise of said housing, at different levels, are supporting beams 9—9. Rotatably mounted upon said supporting beams are cylindrical screens 10—10, each provided with bearing rings 11—11, adapted to run on suitable bearing rollers, or casters, as 12, upon said supporting beams 9. Said cylindrical screens are also provided at their ends with gear rings 13, with which mesh small beveled gears 14, mounted upon short shafts, provided on their outer ends with beveled gears 16, which mesh with driving gears 17, on a vertical driving shaft 18, provided at its lower end with a beveled driving gear 19, driven from a beveled driving gear 20, from any suitable source of power.

Said cylindrical screens, it will be noted, are successively mounted in oppositely inclined directions, whereby matter fed into the upper end of a screen moves by gravity as the screen is revolved to the lower end thereof. Mounted in the end walls of the housing are transfer chutes 21—21, adapted to receive the matter being dried as it is discharged from the lower end of an upper screen and to discharge it into the upper end of the next screen below. A feeding hopper 22, at the upper end, receives the matter to be dried and feeds it through a pipe 23, into the upper end of the upper screen, said pipe 23 being provided with a rotating gate 24, to regulate the feed of the matter to be dried through said pipe 23. A receiving and discharging hopper-like structure 25, is mounted in the lower side of the housing and discharges the dried matter through a pipe, or chute, 26, through the side of the housing, said pipe, or chute, 26, being also provided with a rotating gate 27, which can be used to regulate the passage of the dried matter through the discharge pipe 26. Mounted in the upper end of the housing is an outlet flue-like structure 28, within which is mounted a fan 29, which can be driven from any source of power for drawing air upwardly through the housing, as indicated by the arrows.

An important feature of our invention is a series of baffle plates 30—30, mounted along the opposite sides of the rotating screens, as clearly shown in Fig. 2, which project inwardly and upwardly, with their upper ends adjacent the sides of the screens, whereby all of the air passing upwardly through the housing is forced to pass through the revolving screens and through the matter therein as it is moving gradually and slowly through the screen from the upper end thereof to the lower end thereof.

Thus the matter to be dried can be fed slowly and continuously into the upper end of the upper screen and as it moves downwardly successively through the screens the drying air is passing upwardly through the screen structure and through said matter, which is being gently agitated and turned as it rolls through the revolving screen structures.

The substance to be dried first passes into the upper cylindrical screen where the air is the coolest and where it carries the greatest amount of moisture. This moist, warm air has the effect of a slight steam bath in the substance to be evaporated. This causes the pores or cells of the matter to be dried to open up, thus allowing the water therein to come to the surface and as it comes to the surface it is taken away by the moving air. As the product passes downwardly it comes in contact with increasingly drier air which causes a higher degree of capillary attraction between the moisture on the inside and the drier air on the outside, bringing about a true state of evaporation without breaking the cell structure.

It will be understood, of course, that the temperature of the air passing upwardly through the housing, as well as the speed thereof, can be regulated according to the nature of the matter being dried so as to get the best results possible.

We are aware that changes can be made in the details of our invention without departing from the spirit thereof and we do not, therefore, limit the invention to these details, except as we may be limited by the hereto appended claims.

We claim:

1. An evaporator of the character referred to comprising a vertical housing, means for heating and passing air upwardly through said housing, a plurality of oppositely inclined cylindrical screen structures mounted one above the other, with means for passing matter to be dried from one screen to the other, means for revolving said screens, whereby to agitate the matter passing therethrough, means for feeding the matter to be dried into the upper screen, means for receiving and discharging the dried matter from the lower screen, and means at opposite sides of said screens for directing the air passing upwardly through said housing through the revolving screens, substantially as described.

2. An evaporator of the character referred to comprising a vertical housing having open floor structures spaced one above the other in its lower end, means for heating air passing upwardly therethrough, means for agitating said air, a plurality of oppositely inclined cylindrical screen structures revolubly mounted one above the other in said housing, means for passing matter to be dried from one screen to the other, means for revolving said screens, and a fan in the upper end of said housing for causing a circulation of air upwardly through said housing, said housing being constructed to cause substantially all of the air passing upwardly therethrough to pass through said revolving screen structures, substantially as described.

3. In an evaporator, a housing, a plurality of cylindrical screen structures revolubly mounted therein, one above the other, means for passing the matter being dried from the end of one screen structure into the end of the next screen structure below, means for causing a circulation of air upwardly through said revolving screen structures, and baffle plates at the opposite sides of said screen structures extending lengthwise thereof for directing the air passing upwardly through said housing through said screen structures and through the matter therein, substantially as described.

4. An evaporator of the character shown and described comprising in combination a narrow vertical housing, having open floor structures in its lower end for the passing of air upwardly therethrough, means between said floor structures for heating said air, means in the upper end of said structure for causing an upward circulation of air therethrough, a plurality of cylindrical screen structures mounted in oppositely inclined positions, one above the other, means for passing matter to be dried from the lower end of one screen into the upper end of the next screen below, means for revolving said screens, baffle plates arranged along the opposite sides of said screens for directing the air passing upwardly through said housing through said revolving screen structures, means for feeding matter to be dried to the upper end of the upper screen structure, and means for receiving and discharging said matter from the lower end of the lower screen structure, substantially as described.

Signed at The Dalles, Wasco county, Oregon, this 7th day of April, 1917.

RALPH W. KING.
HERBERT G. MILLER.

In presence of—
 BEN R. LITFIN,
 C. HEDGES.